(12) United States Patent
Craig

(10) Patent No.: US 8,826,774 B1
(45) Date of Patent: Sep. 9, 2014

(54) GEARBOX AND CARTRIDGE INSERT FOR GEARBOX

(75) Inventor: Ronald Scott Craig, Costa Mesa, CA (US)

(73) Assignee: Universal Motion Components Co. Inc., Costa Mesa, CA (US)

( * ) Notice: Subject to any disclaimer, the term of this patent is extended or adjusted under 35 U.S.C. 154(b) by 843 days.

(21) Appl. No.: 12/650,363

(22) Filed: Dec. 30, 2009

(51) Int. Cl.
*F16H 57/04* (2010.01)

(52) U.S. Cl.
USPC ........................................ 74/606 R

(58) Field of Classification Search
USPC ............ 74/425, 606 R, 606 A; 239/160, 728; 137/207; 138/26; 220/721, 722
See application file for complete search history.

(56) References Cited

U.S. PATENT DOCUMENTS

| | | | | |
|---|---|---|---|---|
| 1,690,072 A | * | 10/1928 | Johnson | 220/721 |
| 2,152,485 A | * | 3/1939 | Kindl | 60/588 |
| 3,003,659 A | * | 10/1961 | Miller | 220/722 |
| 3,693,348 A | | 9/1972 | Mercier | |
| 4,004,707 A | * | 1/1977 | Snyder | 220/523 |
| 4,987,796 A | * | 1/1991 | von Kaler et al. | 74/606 R |
| 5,125,291 A | * | 6/1992 | Makita et al. | 74/730.1 |
| 5,979,481 A | * | 11/1999 | Ayresman | 137/14 |
| 6,237,863 B1 | | 5/2001 | Smith | |
| 6,364,924 B1 | * | 4/2002 | Mashiko et al. | 55/385.4 |
| 6,820,822 B2 | | 11/2004 | Daniels | |
| 6,843,747 B1 | * | 1/2005 | Phanco et al. | 475/161 |

OTHER PUBLICATIONS

UMC Final Drive Gearboxes, Model Nos. 725-U, 2005.
Redacted Agreement titled "Advanced Technology Gearbox Option Agreement" between Universal Motion Components (UMC) and a redacted entity, signed by UMC in early 2008, at least one year prior to the filing of the present application.
282 Gearboxes delivered to a customer in 2007 as explained in the Information Disclosure Statement cover letter filed herewith.

* cited by examiner

*Primary Examiner* — Thomas Diaz
(74) *Attorney, Agent, or Firm* — Knobbe Martens Olson & Bear LLP

(57) ABSTRACT

A gearbox for an irrigation system can comprise a housing, a worm gear within the housing and a bull gear within the housing and configured to engage the worm gear. The housing can be configured to receive a removable cartridge. The cartridge can include a diaphragm and a vent. The diaphragm can define a chamber configured for expansion and contraction and configured to be positioned inside the housing to relieve pressure build-up within the housing. The vent can be configured to allow air to flow between the atmosphere and the chamber.

13 Claims, 18 Drawing Sheets

GEARBOX AND CARTRIDGE INSERT FOR GEARBOX

BACKGROUND

The present invention relates generally to the field of driveline components, for example driveline components used in irrigation systems. In particular, the present invention relates to gearboxes and cartridge inserts for gearboxes that can be used in irrigation systems and other systems.

Worm wheel gearboxes have a worm gear that engages a bull gear. Such gearboxes are especially useful where low speed and high torque is desirable. Often, the worm gear is disposed on an input or drive shaft and the bull gear is linked to an output shaft. The gearbox can also be sealed. These worm wheel gearboxes are commonly used, for example, in agricultural irrigation systems and potato pilers.

Irrigation systems are widely used throughout the world to provide water for agricultural purposes in arid regions. Such systems include center pivot irrigation and lateral move systems. Typically, such systems include a series of spaced apart support towers connected by truss sections that support an elevated water distribution pipe between the towers. The trusses are linked together, enabling such irrigation systems to stretch to lengths of a thousand yards or more. In center pivot systems, the water distribution pipe extends radially from a central pivot communicating with a pressurized water supply. In lateral or linear move irrigation systems, the water distribution pipe extends laterally from a canal feed or hose drag system that provides a pressurized water supply.

Water passing through the distribution pipe is forced out through a number of sprinkler heads, spray guns, drop nozzles, and the like, spaced along the length of the pipe. Each tower in the system is supported on wheels that are driven at low speeds to move the tower in a circular path about the central pivot, or a linear path in the case of lateral move systems, to thereby irrigate a tract of land.

A number of drive assemblies have been developed for driving the support wheels of sprinkler irrigation systems. The most common drive assembly includes an electric motor connected to a center gear drive assembly, a first wheel gear assembly coupled to the center gear drive assembly by a first drive shaft, and a second wheel gear assembly coupled to the opposite side of the center gear drive assembly by a second drive shaft. Each of the first and second drive shafts typically has a driveline coupler at each end that allows the shafts to be quickly and easily pulled apart and put back together to facilitate field maintenance and/or towing from field to field.

The wheel gear assemblies generally include a wheel connected to a gearbox. The gearbox can be a sealed worm wheel gearbox that is provided having a worm disposed on a driveshaft. The worm engages a bull gear within the gearbox. The motor can drive a shaft which acts as the input shaft to the worm wheel gearbox. The bull gear is linked to an output shaft. The output shaft has an output flange which connects to the driven wheel. Rotation of the input shaft is thus transmitted via the gearbox to the output shaft, driving the wheels of the irrigation system.

A typical irrigation watering system has a number of such support wheels and each wheel or pair of wheels typically is driven by a motor and worm wheel gearbox as described. Worm wheel gearboxes are especially advantageous in this environment because once the drive motor stops, the worm and bull gear combination allow very little additional movement such as coasting. Thus, the irrigation system will remain in its position even if it is on a hill or other unlevel surface.

The farm environment tends to be wet, muddy, silty and dusty. Thus, these gearboxes are generally sealed to prevent contamination of the gearbox contents, such as the oil contained therein.

Worm wheel gearboxes are also commonly used in potato pilers. A potato piler comprises a conveyor disposed on a wheeled frame. To enable even piling of potatoes, the conveyor must be moved short, precise distances during operation. Potato pilers thus typically comprise a motor which rotatably drives a shaft and a worm wheel gearbox that transmits the shaft rotation to drive the wheels of the potato piler. This enables the potato piler to be moved short, precise distances when piling potatoes.

SUMMARY

There exists a continuing need to provide improvements in gearboxes and in worm wheel gearboxes. For example, there exists a need to improve the ability of gearboxes to appropriately deal with changes in temperature and internal pressure. There also exists a need to introduce sensors into gearboxes in a reliable way that will not cause the gearbox to leak oil. In both situations proper seals should be maintained to prevent contamination of the gearbox contents.

According to some embodiments, a cartridge insert for coupling to an irrigation system gearbox can comprise a bottom portion having an expansion chamber defining an inner cavity and a top portion having a vent. The vent can be in fluid communication with the inner cavity and the atmosphere to equalize a pressure difference between the inner cavity and the atmosphere. The top portion can be configured to sealingly connect to the gearbox. The bottom portion can be configured to be positioned completely within the gearbox.

The cartridge insert can further include at least one sensor port for connecting a sensor to the top portion. In some embodiments, it may further include at least one of many different types of sensors, including a temperature sensor, an oil level sensor, a pressure sensor and a moisture sensor. The expansion chamber can be a rubber diaphragm that in some embodiments is positioned to attach to a back section of the bottom portion of the cartridge. In addition, the at least one sensor port can be configured such that a sensor to be connected to the at least one sensor port that extends from the top portion to the bottom portion extends along a front section of the bottom portion.

Certain embodiments of a cartridge for insertion into a slot in an outer casing of a gearbox can comprise a bottom portion having an expansion chamber defining an inner cavity, a connecting portion having a channel in fluid communication with the inner cavity, and a top portion having a vent, the vent in fluid communication with the channel. The top portion can be configured to sealingly connect to the outer casing and the bottom portion can be configured to be within the outer casing.

Some embodiments of a gearbox for an irrigation system can comprise a housing, a worm gear within the housing, a bull gear within the housing and configured to be engaged with the worm gear, and a removable cartridge configured to couple to the housing. The cartridge can include a diaphragm and a vent. The diaphragm can define a chamber configured for expansion and contraction and configured to be positioned inside the housing to relieve pressure build-up within the housing. The vent can be configured to allow air to flow between the atmosphere and the chamber.

In some embodiments, the cartridge can be configured to be adjacent the worm gear with the diaphragm on a back side of the cartridge away from the worm gear. The cartridge can further comprise at least one sensor port. The at least one sensor port can be configured to allow an attached sensor to extend vertically uninterrupted to a bottom of the housing, and/or to position a sensor inside the gearbox between a front side of the cartridge and the worm gear, and/or to position a sensor inside the gearbox between a front side of the cartridge, a bearing, a shaft and the worm gear.

In certain embodiments, a gearbox for an irrigation system can comprise a housing, a worm gear within the housing and a bull gear within the housing and configured to engage the worm gear. The housing can comprise a cartridge opening at a top of the housing configured to receive an expansion cartridge, the opening having a main section and at least one lobe extending from the main section and configured to allow a sensor connected to the cartridge to enter the housing, the lobe positioned to allow the sensor to extend vertically downward from the lobe towards a bottom of the housing.

The gearbox can include a second lobe and each lobe can be on opposite ends of the opening. The opening can be covered with a diaphragm. An expansion cartridge can be received into the opening.

DETAILED DESCRIPTION

Figure 1A:
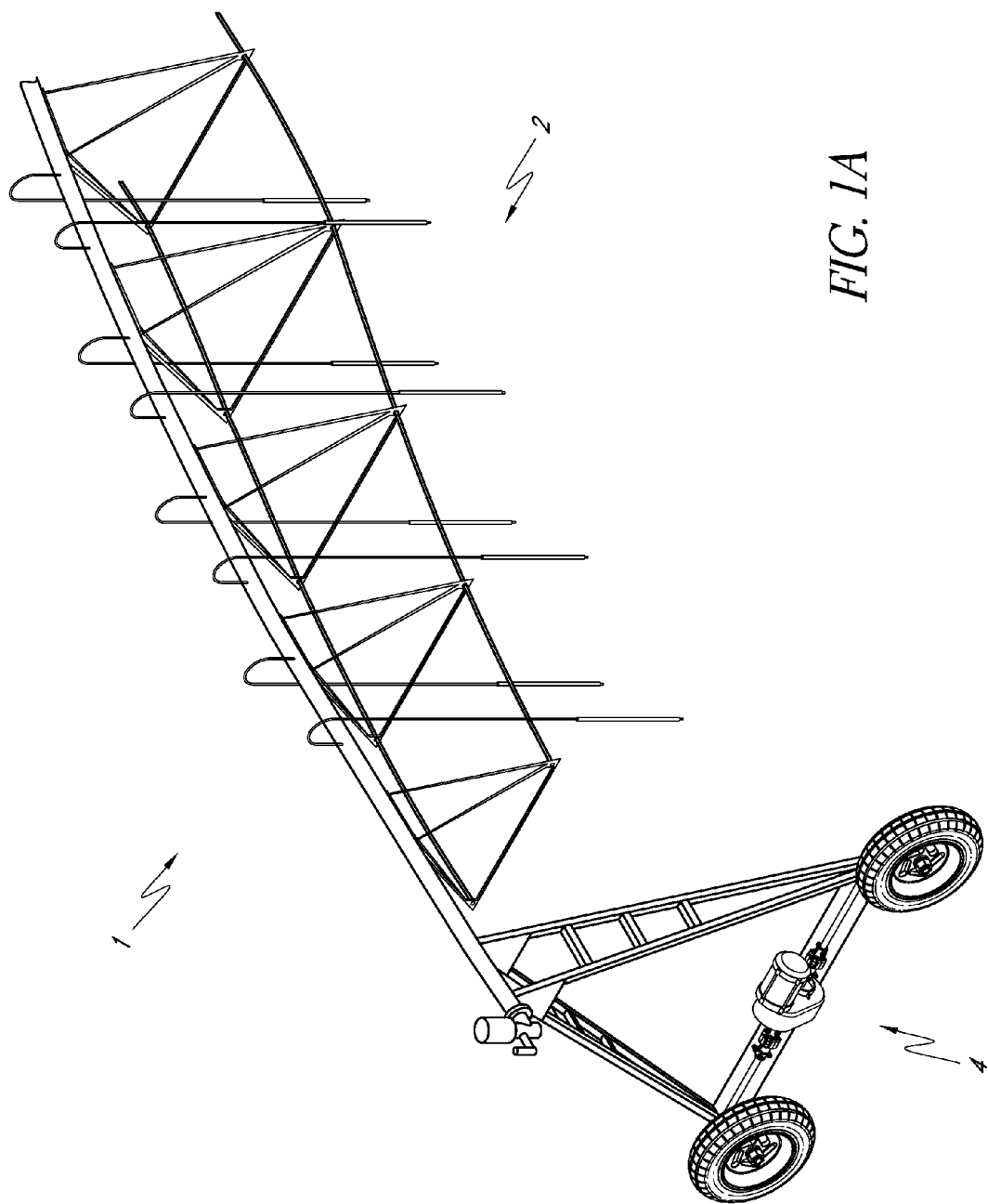
FIG. 1A illustrates part of an irrigation system with a drive assembly.
Figure 1B:
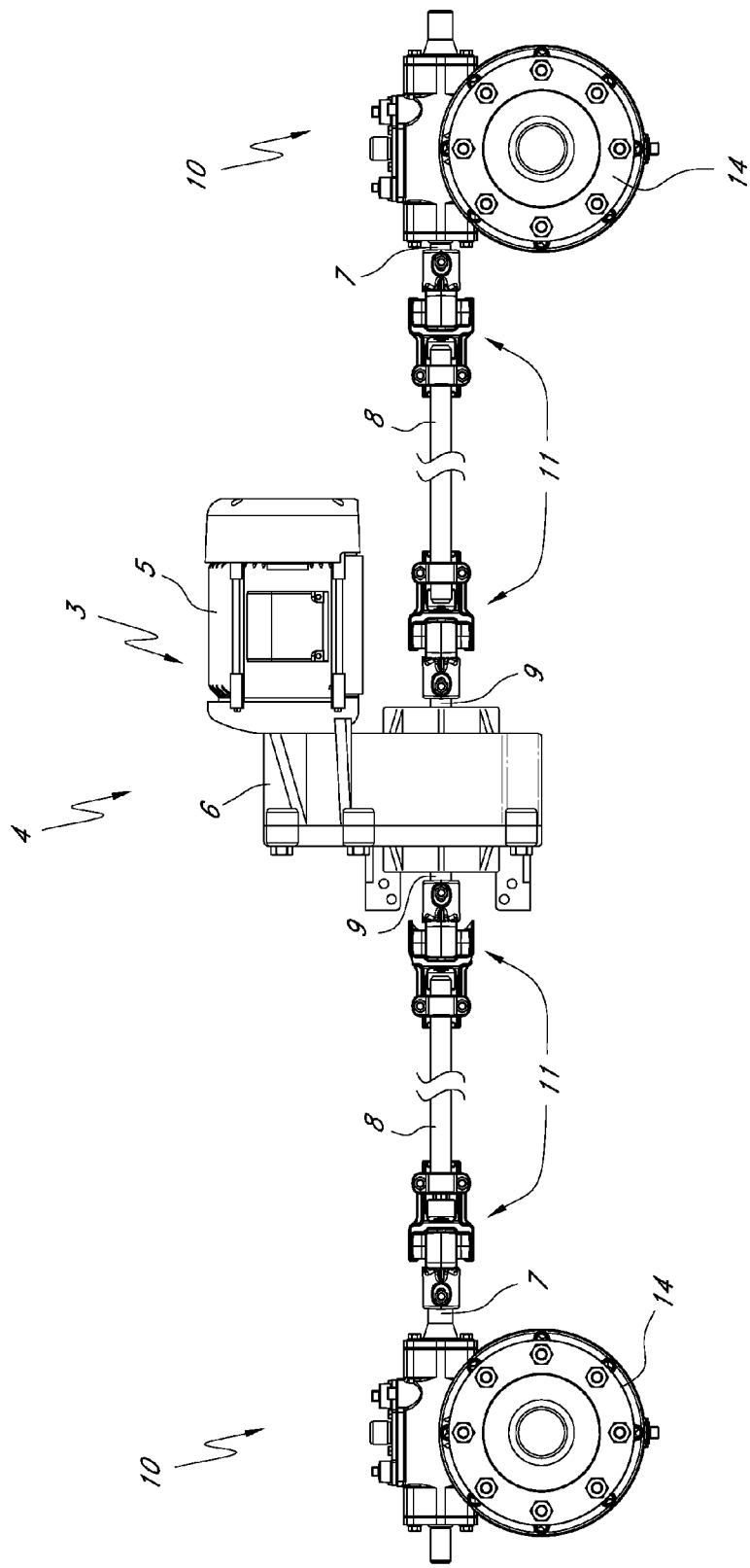
FIG. 1B shows part of a drive assembly with a center drive, wheel gearboxes, drive shafts and driveline couplers.

An irrigation system 1 for providing water for agricultural purposes and as partially shown in FIG. 1A, can have a water piping and delivery system 2 and a drive assembly 4. An embodiment of a drive assembly 4 is shown in more detail in FIG. 1B. A drive assembly 4 can have a center drive 3, a wheel gearbox 10, a shaft or drive shaft 8 and one or more driveline couplers 11. A center drive 3 can have motor 5 connected to a gearbox 6 to deliver a torque to a drive shaft 8. Driveline couplers 11 are shown connecting the drive shafts or shafts 7, 9 of the gearboxes 10 and center drive 3 to the drive shafts 8. Drive shafts 8 typically have a driveline coupler 11 at each end to allow the shafts 8 to be quickly and easily pulled apart and put back together to facilitate field maintenance and/or towing from field to field.

In use, hub 14 on the gearbox 10 can connect with a wheel. The center drive 3 can drive the drive shaft 8 which in turn can drive the gearbox 10. The gearbox 10 can transfer the motion of the turning drive shaft 8 into a rotational motion at the hub 14 to turn the wheel and drive an irrigation system 1. The gearbox 10 can be either non-towable or towable. The wheel gearbox 10 can have a handle (not shown) that can be used to disengage the gears inside the gearbox to allow free rotation of the hub 14. Alternatively, the wheel gearbox could be fitted with a towable hub.

In a towable state, a driveline coupler 11 can be separated so that the wheel gearbox 10 can be rotated or pivoted to a new orientation. Also, the handle can be used to disengage the gears inside the wheel gearbox 10. In this state, the wheel gearbox 10 is no longer connected to the center drive 6 and is free to rotate. In a typical operation a farmer or user can attach a system 1 in a towable state to a tractor or truck and tow the system to a new location, such as to a different field. Examples of a towable wheel gearbox can be found in U.S. Pat. No. 6,237,863, entitled "Disengageable Worm Wheel Gearbox," which is incorporated herein by reference in its entirety and made a part of this specification.

Figure 2:
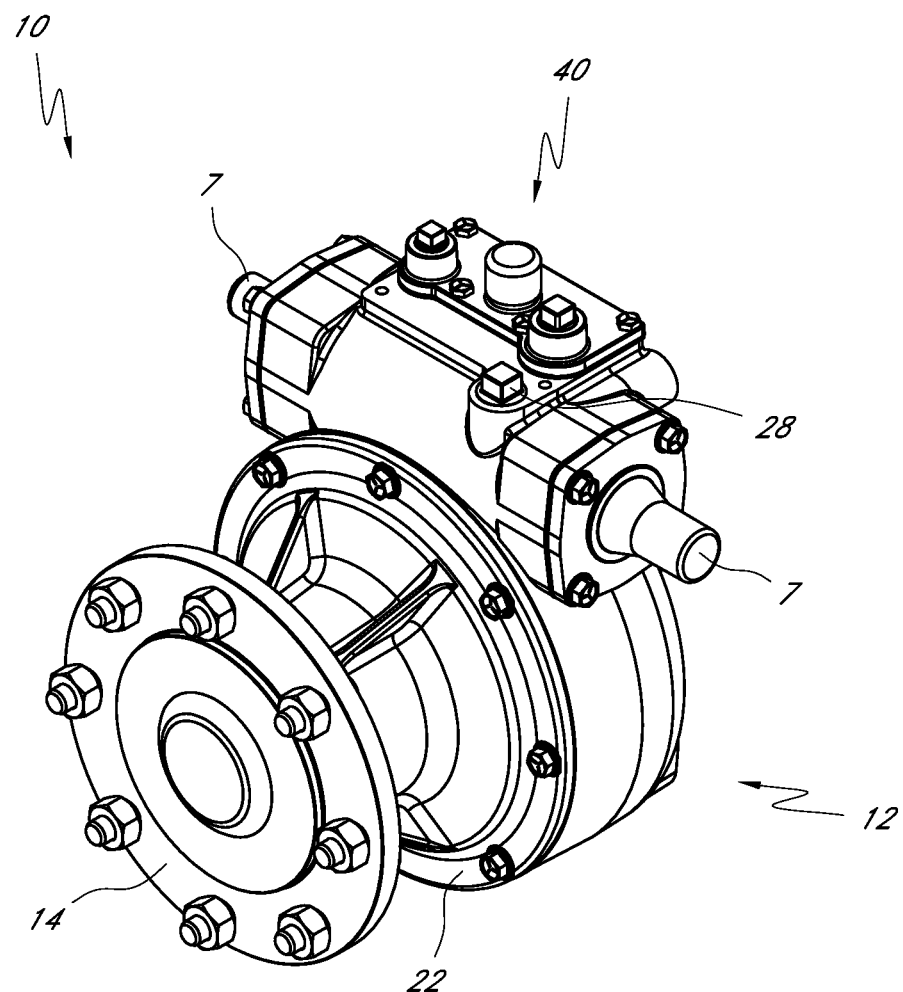
FIG. 2 shows one embodiment of a wheel gearbox.
Figure 3:
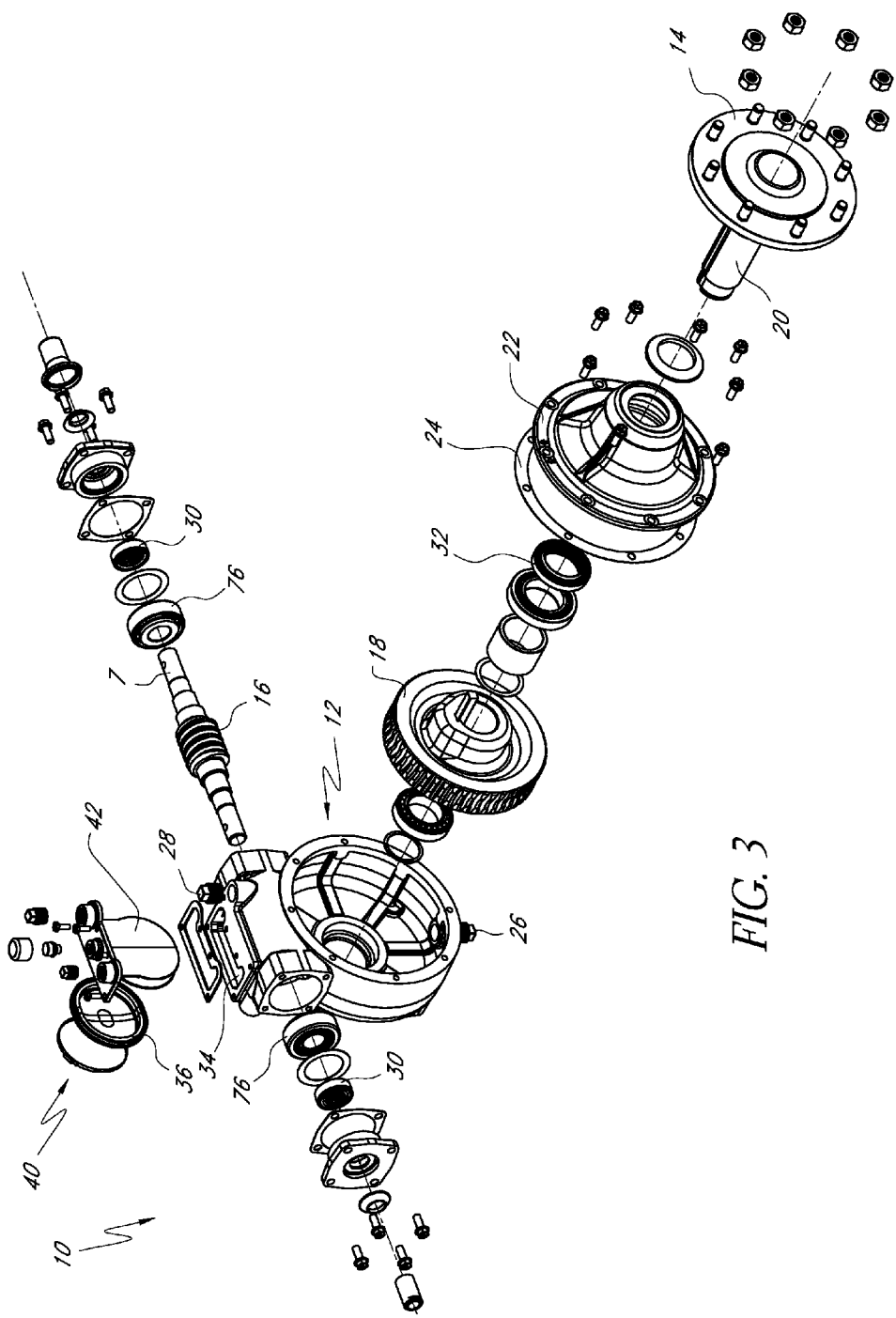
FIG. 3 is a partially exploded view of the gearbox of FIG. 2.
Figure 4:
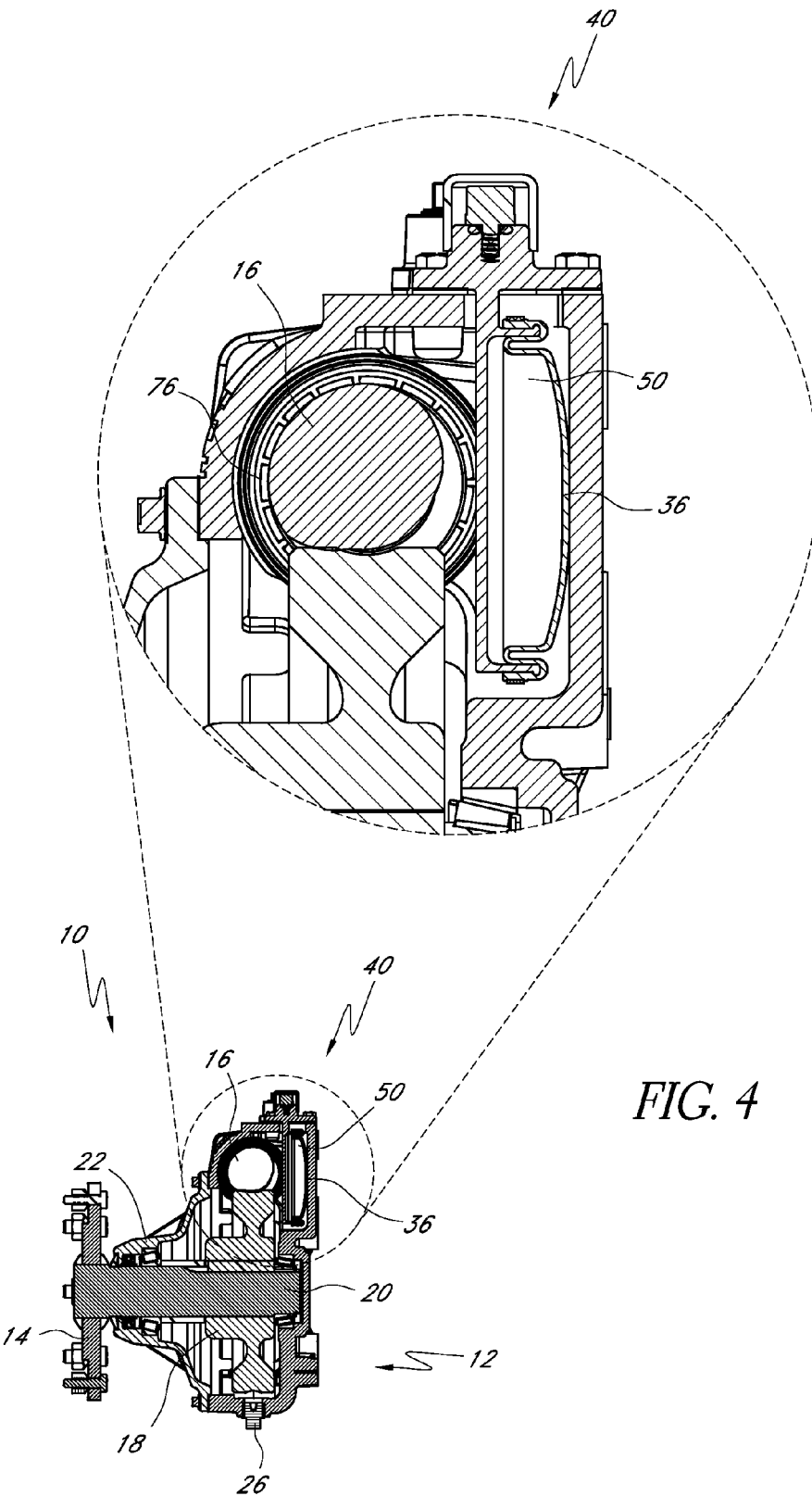
FIG. 4 illustrates a cross-sectional view of the gearbox of FIG. 2 including a detail view of part of the top of the gearbox.

Referring next to FIGS. 2-4, a worm wheel gearbox 10 is shown in more detail. The worm wheel gearbox 10 preferably comprises a gearbox housing 12, a driveshaft 7 having a worm gear 16 disposed thereon, and a bull gear 18 in driving relation with an output shaft 20. The worm gear 16 engages the bull gear 18 within the gearbox housing 12. The output shaft 20 is connected to an output flange or hub 14 which can be attached to a wheel.

The bull gear 18 and output shaft 20 are arranged in the gearbox housing 12 to provide for transfer of torque. A gearbox cover 22 with a gasket 24 is attached to the housing 12. The worm wheel gearbox 10 can also include various other components, such as bearings 76, bearing cups, shims, spacers, o-rings, seals 30, gaskets, etc.

A gear oil bath can lubricate the contents of the gearbox 10. For example, the gearbox 10 can be substantially full of oil. In other embodiments, the gearbox 10 can be less than full of oil, i.e. 10-90%, 25-75%, or 50% full. In some embodiments, the gearbox 10 can have an air gap, such as a 1 inch air gap. It can be beneficial to reduce or eliminate the air gap inside the gearbox to reduce the possibility of condensation within the gearbox. The gearbox can hold a predetermined amount of oil, such as 1 gallon or 4 quarts of oil. Other embodiments can hold more or less than this, such as 3 quarts, 5 quarts, and 8 quarts. As mentioned, the predetermined amount of oil can substantially fill the gearbox or leave an air gap.

The gearbox 10 can include a drain plug 26 and a fill plug 28. The fill plug 28 can be used to add a lubricant, such as oil, into the gearbox 10. The drain plug 26 can be used to drain some or all of the lubricant, or other liquids, such as water, from the gearbox 10. It can be undesirable to allow water, such as the water from condensation, to build up within the gearbox 10. The drain plug 26 can be used to drain this water. It can also be used, for example, to change the oil.

The drive assembly 4, and therefore the gearbox 10, is often used in a dirty and corrosive environment. As discussed, a gearbox 10 can be used on irrigation equipment 1 in fields to provide water to crops and the like. In this environment, the gearbox 10 can be exposed to the elements for extended periods of time. The irrigation equipment 1 can travel through dirt and rocks and the gearbox 10 can likewise be affected by these elements. The irrigation equipment 1 itself can be constantly wet as water is provided to the field. Also, irrigation equipment 1 is often used in hot climates. Thus, a gearbox 10 can be exposed to direct sunlight, and constantly wetted and then dried by the sun. In addition, the mornings and nights can be very cold. These conditions can be highly corrosive to the irrigation equipment 1 and can expose the components to extreme fluctuations in temperate and other conditions.

The gearbox 10 is generally sealed. This allows the gearbox 10 to be used in corrosive environments while limiting the impact of the environment on the internal components. For example, the various seals and gaskets on the gearbox can block water and contaminants from entering the gearbox, thus maintaining the gearbox in better condition and requiring fewer oil changes and other maintenance then may otherwise be required.

In addition to the outside conditions experienced by the gearbox 10, during use the internal gear oil may become hot and expand. This can increase the oil pressure. At other times, the gear oil may cool and contract, decreasing the oil pressure. For example, in many cities of the United States it is typical for the average difference between the high and low temperature of a typical summer day to be around 20-30° F. Other factors, such as rainfall, shade, direct sunlight, amount of use, etc. can increase the range of temperatures that a gearbox may experience in a day. Thus, during the course of a day, the gearbox can experience extreme swings in temperature and pressure. It has been found that this increased oil pressure can cause the seals 30, 32 around the drive shaft and output shaft to fail, or to have a shortened life span therefore requiring early replacement. The pressure inside the gearbox has been found to increase by 5-7 psi which can force the seals against the drive shaft, causing the seals to wear faster due to the additional force. Not only do the seals have to be replaced earlier but oil can leak out of the gearbox because of the increased pressure.

An expansion chamber can be provided to regulate the internal change of pressure. An expansion chamber can help to prevent the seals 30, 32 from failing and the oil from leaking out of the gearbox.

Figure 5:
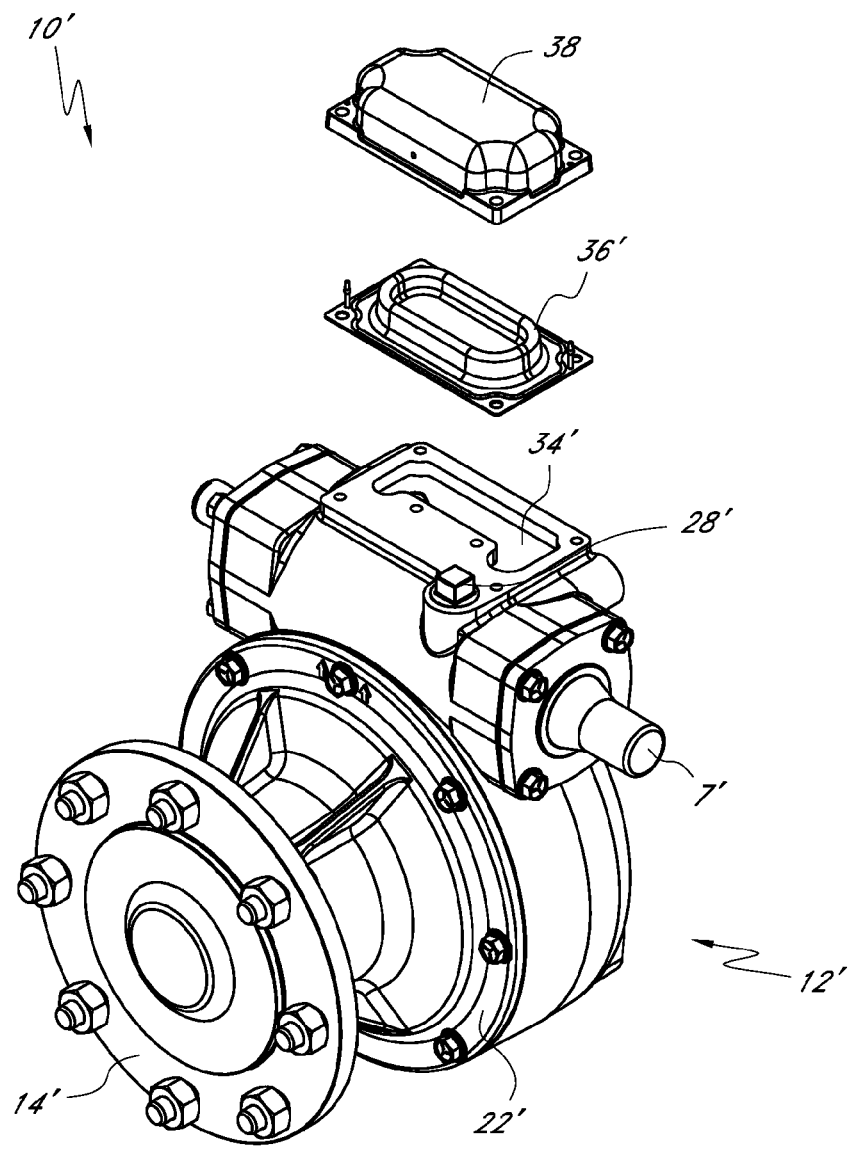
FIG. 5 shows a partially exploded view of another embodiment of a wheel gearbox.
Figure 6:
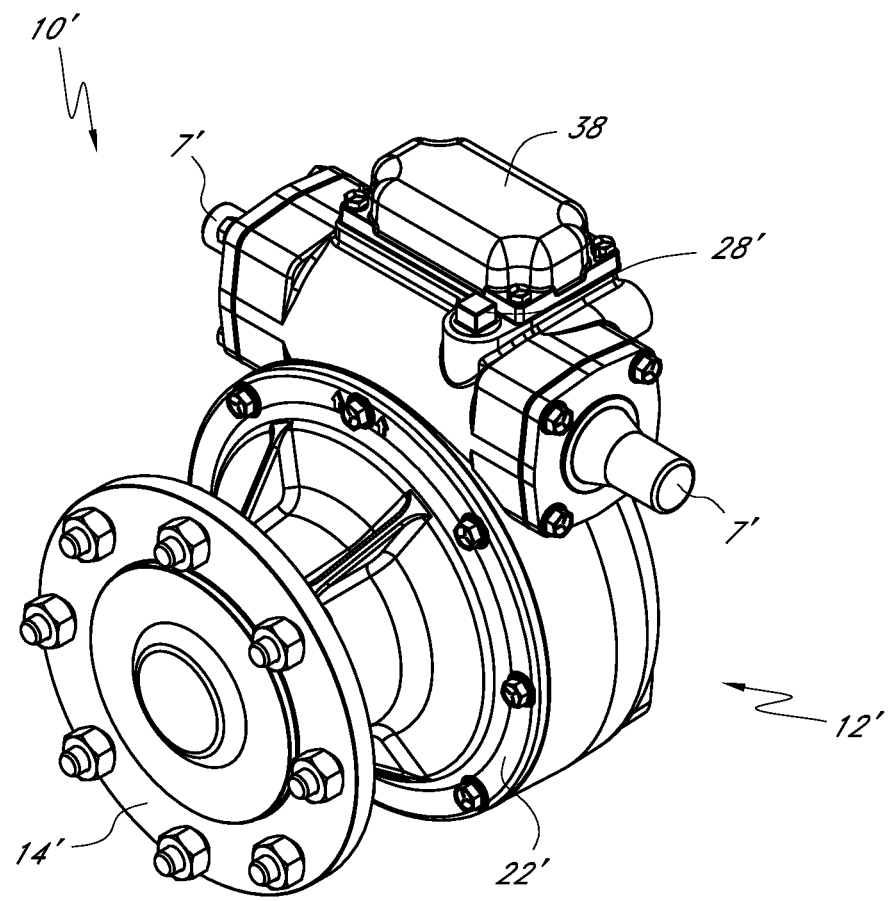
FIG. 6 is an assembled view of the gearbox of FIG. 5.

FIGS. 5-6, illustrate another embodiment of a gearbox 10'. Numerical reference to components is the same as in the previously described arrangement, except that a prime symbol (') has been added to the reference. Where such references occur, it is to be understood that the components are the same or substantially similar to previously-described components.

In FIG. 5 it can be seen that a rubber diaphragm 36' can be used as an expansion chamber that can be connected to the top of the gearbox 10'. The diaphragm 36' can cover and seal an orifice 34' and can expand or contract to relieve changes in internal pressure. For example, when the gear oil becomes hot the oil expands, increasing the internal pressure. The diaphragm can then also expand to relieve the pressure and reduce the stress on other components, such as seals and gaskets. The diaphragm 36' can be exposed to the atmosphere on one side and exposed to the internal pressure of the gearbox 10' on the other side. This can allow the diaphragm 36' to normalize the internal pressure of the gearbox 10' with atmospheric pressure.

A cover 38, such as a steel cover (FIG. 6), can be used to encase the rubber diaphragm 36'. The cover 38 can protect the diaphragm 36'. For example, the cover 38 can protect the diaphragm 36' from direct sunlight which can have the effect of breaking down and shorting the life of certain materials such as rubber.

To ensure that one side of the diaphragm 36' is exposed to the atmosphere the cover 38 can include a hole or some other feature so as to not create a sealed chamber inside the cover and around the diaphragm.

Returning now to the embodiment of the gearbox 10 shown in FIGS. 2-4, it can be seen that a cartridge 40 can also be used to relieve internal pressure in the gearbox 10. The cartridge 40 can have an expansion chamber thereon. The expansion chamber can include a diaphragm 36 that can expand or contract in response to a change in pressure inside the gearbox 10.

Having the diaphragm 40 or other expansion chamber inside the gearbox can provide certain benefits. For example, a rubber diaphragm can sit in a bath of gear oil which can increase the flexibility and the life of the diaphragm. Having the expansion chamber inside the gearbox does not require a separate cover to protect the expansion chamber. The outer housing of the gearbox itself can cover and protect the expansion chamber. The outer housing can be much stronger than a steel cover and offer more protections. For example, a steel cover can become dented, potentially decreasing the ability of the expansion chamber, such as a diaphragm to expand or contract.

As will be described in more detail below, the cartridge 40 can also beneficially provide an access route into the gearbox 10 to provide sensors that can measure or detect certain parameters inside the gearbox 10.

Figure 7:
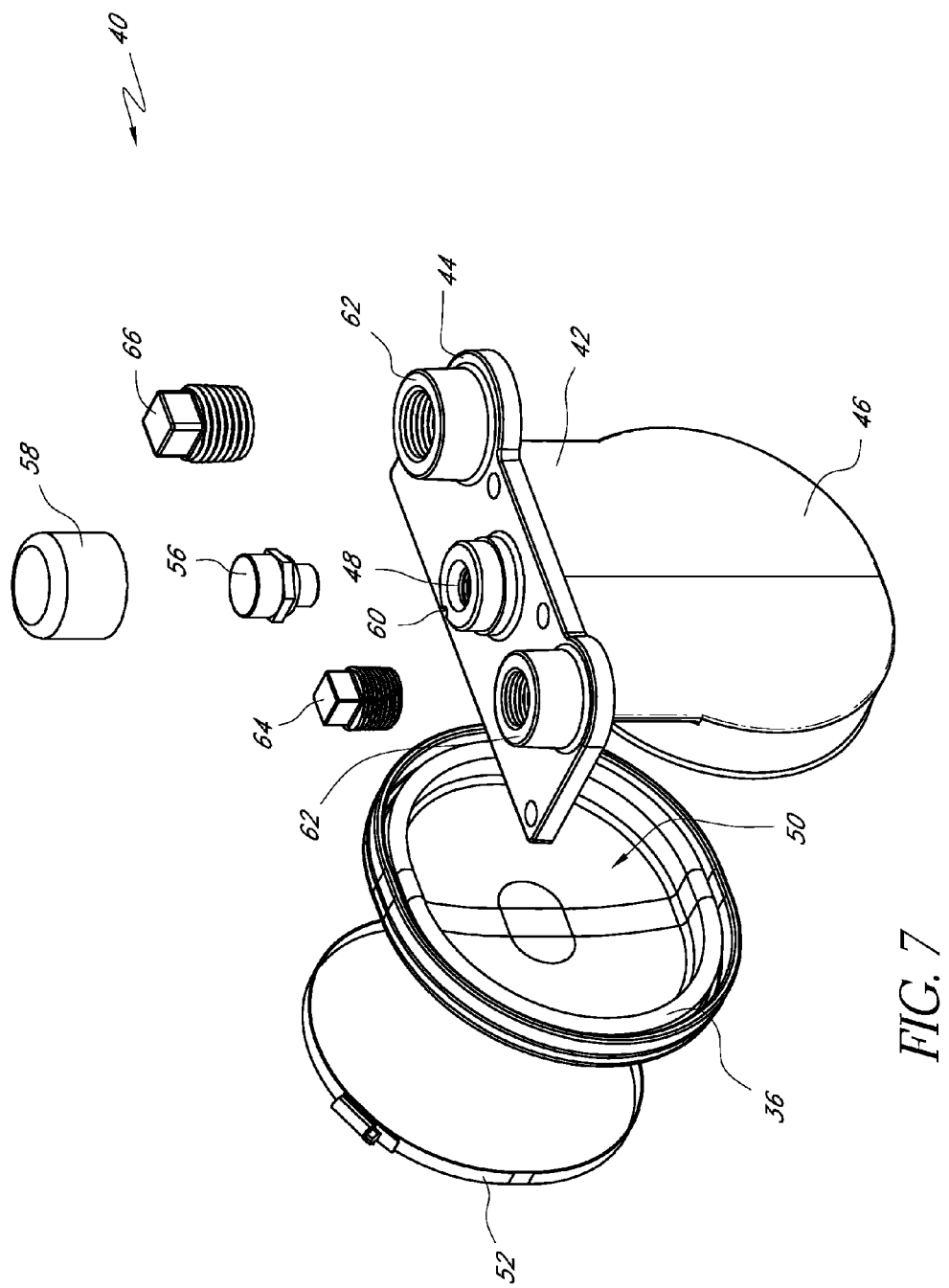
FIG. 7 shows an exploded view of an embodiment of a cartridge.
Figure 8:
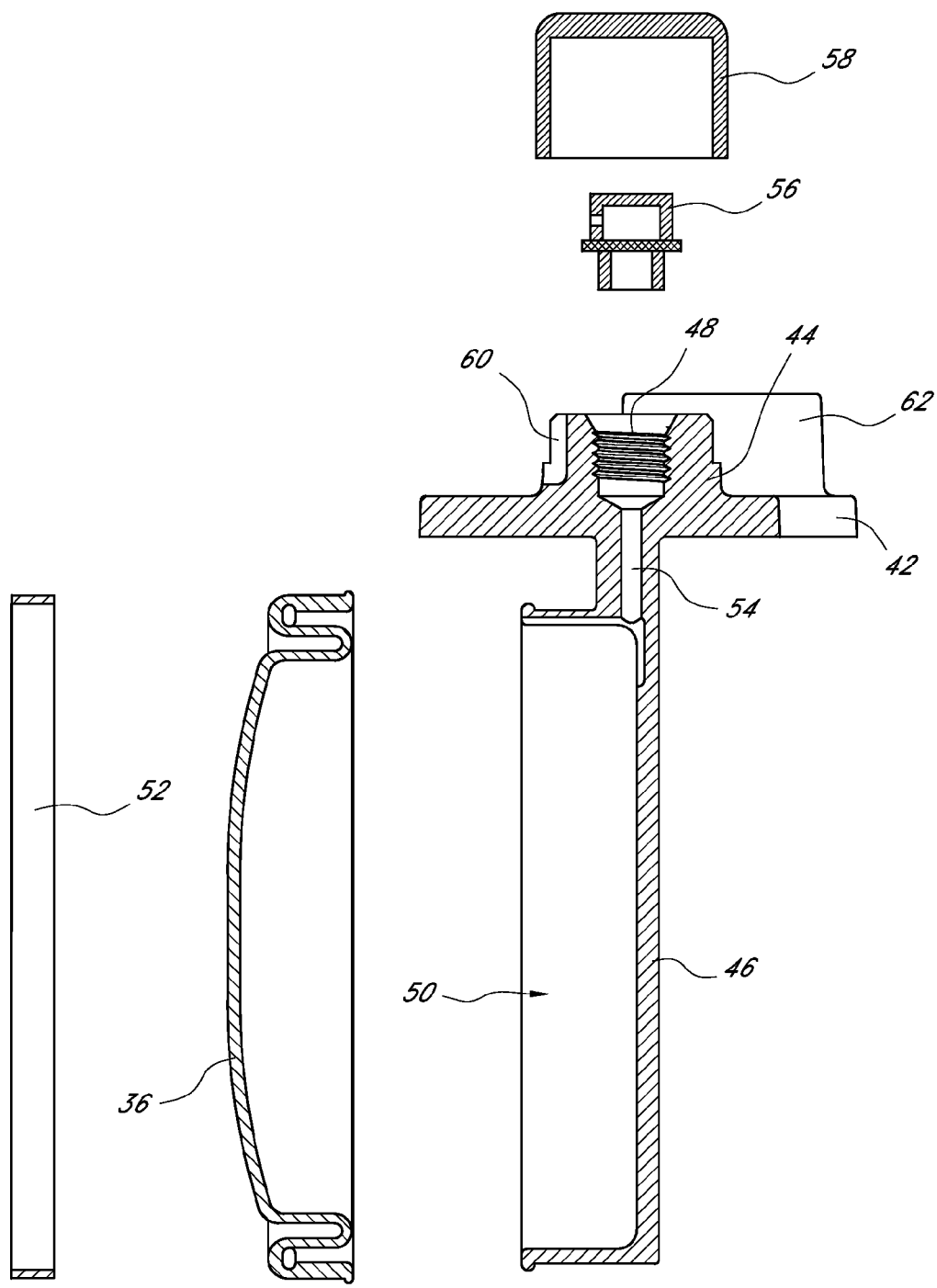
FIG. 8 is a cross-sectional view of an embodiment of a cartridge.
Figure 9:
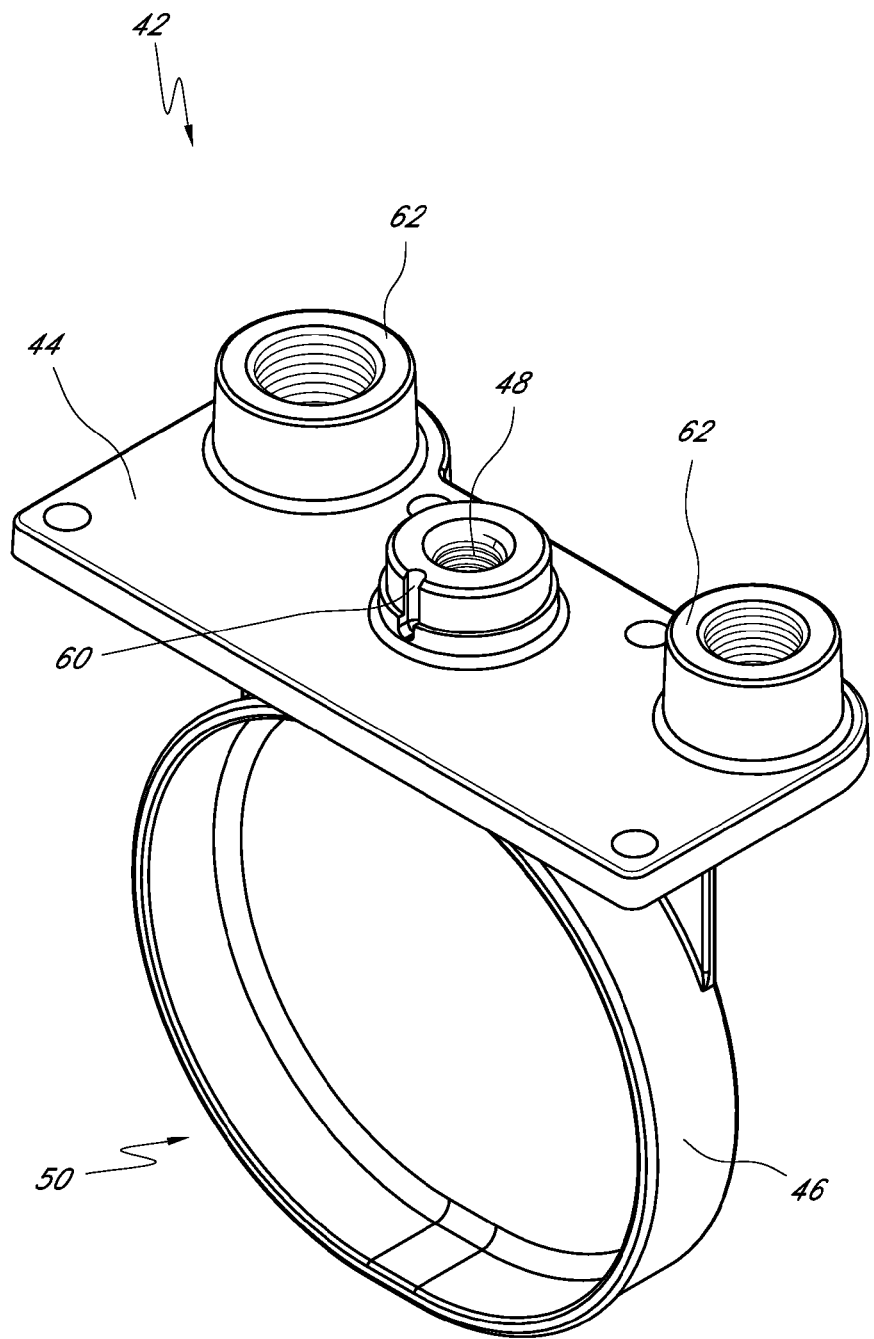
FIG. 9 illustrates an embodiment of a cartridge body.
Figure 10:
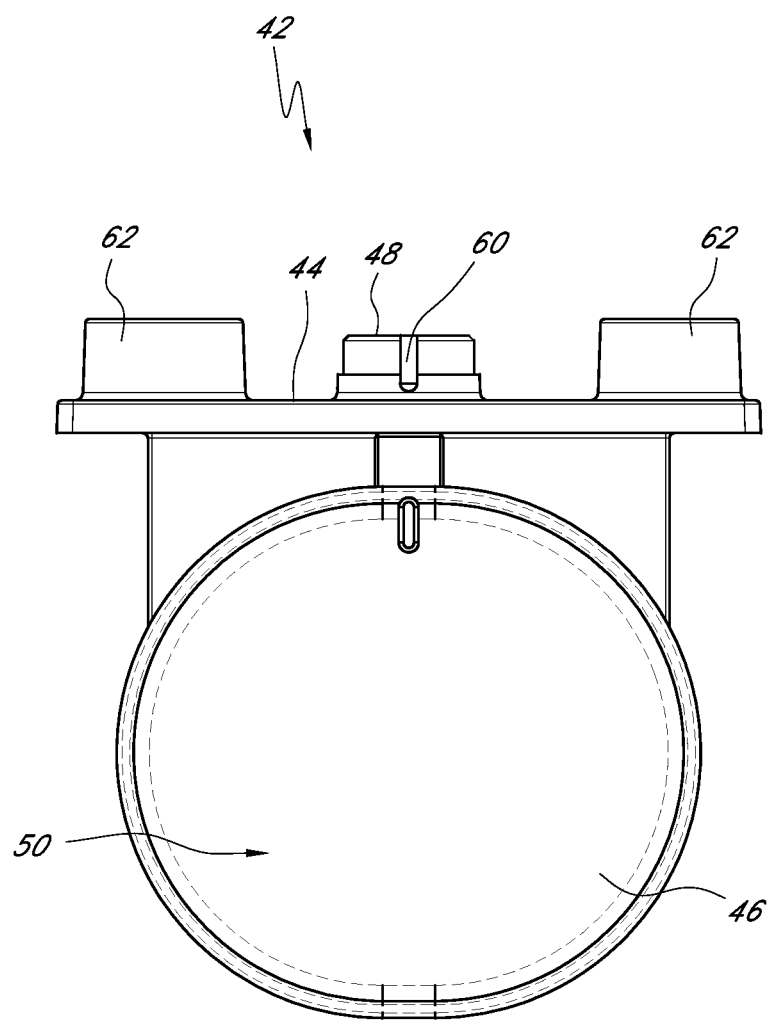
FIG. 10 shows another view of the cartridge body of FIG. 9.
Figure 11:
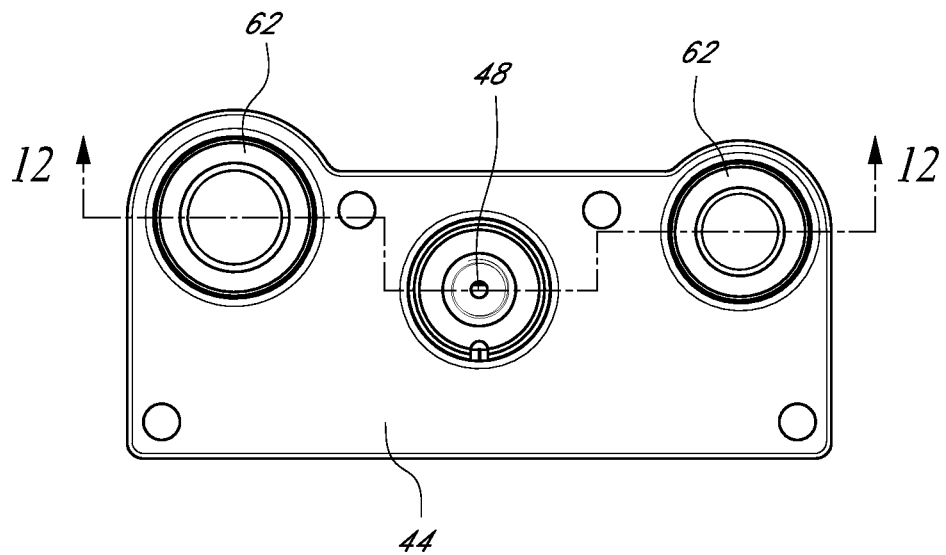
FIG. 11 is still another view of the cartridge body of FIG. 9.
Figure 12:
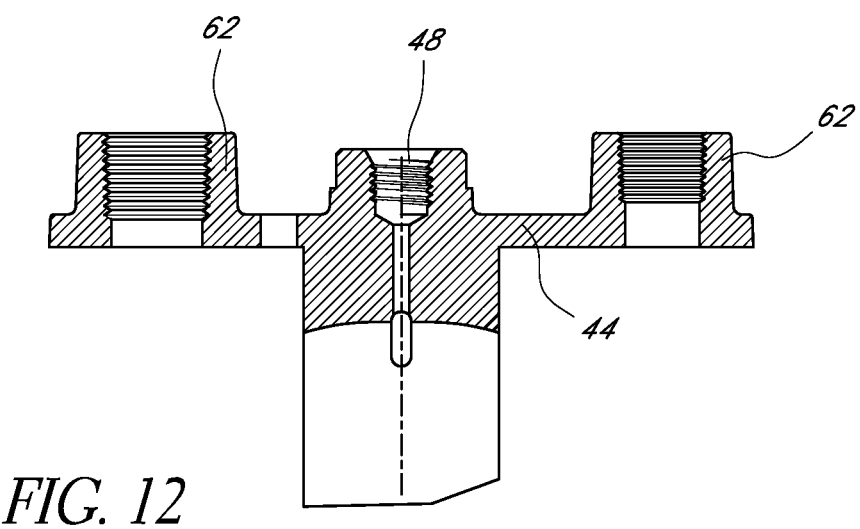
FIG. 12 is a cross-sectional view of the cartridge body taken along line 12-12 of FIG. 11.

FIGS. 7-8 show one embodiment of a cartridge 40 that can be inserted into a gearbox 10. The cartridge 40 can include many different features depending on the embodiment. As illustrated, the cartridge 40 includes a cartridge body 42 with a top portion 44 and a bottom portion 46. The top portion 44 can be used to connect the cartridge 40 to the gearbox 10 while the bottom portion 46 is positioned inside of the gearbox 10. Other types of cartridges can also be used.

Some embodiments of the cartridge 40 can include a diaphragm 36, and a vent 48. As shown, the diaphragm 36 can connect to the bottom portion 46 of the cartridge 40 to form a chamber 50. The movement of the diaphragm can change the size of the chamber 50. The chamber 50 can expand or contract in one or more directions to normalize the pressure inside the gearbox 10 with the pressure outside the gearbox 10. The diaphragm 36 can be connected to the bottom portion 46 with a clamp 52, by a friction fit, a press fit or some other method.

The diaphragm 36 can be configured to be positioned inside the outer casing and to relieve pressure build-up within the outer casing caused from changes in temperature and the related thermal expansion or contraction of a volume of oil configured to be held within the outer casing. It has been found in testing that a gearbox without pressure relief experienced an increase of 6 psi with an oil temperature rise of 60.5 degrees F. A gearbox with a cartridge and a diaphragm under the same testing experienced an increase of 0.5 psi.

The diaphragm or other type of expansion chamber can be one of many different devices that can expand and contract in response to a pressure change. The expansion chamber can be any of multiple shapes and sizes and can be connected to the cartridge body 42 in many different ways. For example, in some embodiments, the expansion chamber can comprise a balloon (not shown) that forms the bottom portion of the cartridge and connects directly to the underside of the top portion.

Looking back to FIG. 4, one method of positioning the cartridge 40 inside the gearbox is shown. The diaphragm 36 can be positioned to face away from the gears 16, 18 or any other moving parts, such as the shaft 20. As the diaphragm 36 is attached to a back side of the cartridge 40, it will expand and contract away from the moving parts. Thus, the diaphragm 36 is positioned so that it will not expand or contract into any moving parts or be drawn into them. As shown in FIG. 4, the diaphragm 36 is contacting the housing 12. This can be a first empty configuration. The presence of oil or other lubricant can increase the pressure inside the housing and cause the diaphragm to contract or move away from the housing to a second configuration. As the temperature and pressure increases or decreases, the diaphragm can assume other contracted or expanded positions.

It can be desirable to limit the size of the opening and the amount of space available for the diaphragm inside the gearbox. This can be to, for example, decrease material costs, decrease the possibility of contamination, and maintain the structural integrity of the outer housing. It can also be desirable to maintain a compact configuration and thereby maintain a similar footprint to existing models so that existing models can be easily exchanged or replaced for the improved gearbox.

In some instances it has been found that a diaphragm can be forced to move towards a worm gear or other moving part when it is facing the gear or part. For example, in cold conditions a vacuum can be created as the worm gear rotates. This vacuum can cause a diaphragm to move towards the worm gear. This undesirable affect can prevent the diaphragm from functioning properly. In some embodiments, the front section of the bottom portion 46 of the cartridge 40 is substantially solid to prevent any interaction between the cartridge 40 and the moving parts inside the gearbox 10.

Returning now to FIGS. 7-8, it can be seen that the chamber 50, formed by the diaphragm 36 and the bottom 46 of the cartridge, can be vented to the outside through a vent 48. This can allow the expansion chamber 50 to be inside the gearbox 10 and yet exposed to the outside atmosphere and properly compensate for a change in pressure within the gearbox 10.

The vent 48 can take many forms. For example, the vent 48 can have a first channel 54, a filter 56, a cap 58 and a second channel 60. From the chamber 50, air can flow through the first channel 54, then through the filter 56 into the cap 58 and then out the second channel 60.

The vent 48 can be configured in such as way as to allow air flow through the channel and substantially prevent other flows such as water, mud, etc. through the vent. For example, configuring the vent to have a tortuous path, as shown, can help prevent water and other material from entering the vent 48 and the chamber 50. In addition, a filter 56 can further help prevent material from entering the chamber 50. An example filter 56 is a screw-in vent with internal filter labeled as a POV/metal vent, available from W. L. Gore & Associates, of Newark, Del. In addition a cap 58 can be used to cover the filter 56, to protect it and to add additional turns in the vent path.

In certain embodiments, the cartridge 40 can further include one or more sensor ports 62 (FIG. 7). A sensor 64 can be positioned within the sensor port 62. In some embodiments, when the sensor port 62 is not in use by a sensor, the port 62 can be capped off or plugged, such as by a plug 66. In other embodiments, the gearbox 10 can have a sensor port separate from the cartridge. For example, the fill plug 28 can be used as a sensor port.

The one or more sensor ports 62 can be located on the top portion 44 of the cartridge body 42. This can allow the sensor 64 that uses the sensor port 62 to have an access point into the gearbox 10, while also allowing for the maintenance and repair of the sensor 64 without having to remove or adjust the cartridge 40 or other parts of the gearbox 10.

It may be desired to have certain sensors in certain gearboxes in an irrigation system while other gearboxes do not have sensors or have different sensors. The sensor ports 62 on the cartridge can beneficially allow a user to establish different sensing set-ups that can be used in different gearboxes at different periods of time. These cartridges set-ups can be rotated or swapped out periodically. This may also be a way of reducing costs and also of sampling to statistically determine certain parameters for the system.

For example, one cartridge can be set-up with certain sensors and another cartridge can have other sensors or even no sensors. These two different cartridge set-ups can then be used in an irrigation system with many different gearboxes. Some or all of the gearboxes can be configured to accept either cartridge set-up. Sections of the irrigation system can then be monitored for certain periods of time. After the period of time, one or both of the cartridge set-ups can be moved to a different gearbox, for example, a different gearbox at a different position on a line of gearboxes. This can be a means of sampling certain measured parameters in the irrigation system.

The sensor 64 can be configured to transmit information by wire or wirelessly. For example, a transmitter can be located on or near the gearbox 10. The transmitter can receive information from the sensor. This information can be transmitted from the transmitter periodically or on a real time basis to a receiver or central computer or monitor and can be transmitted via wires, radio wave, cell phone, etc. The transmitter and/or the sensors can be powered through various methods including electrical connections, battery, generator, etc.

Though not shown, bottom portion 46 of the cartridge can also be used to carry one or more sensors. Thus, one or more sensor ports can be located on the bottom portion 46 of the cartridge. For example, a sensor 64 may be advantageously positioned on the bottom portion 46 in the space below the worm gear. A sensor attached to the bottom portion 46 of the cartridge can be wired or wireless. For example, a wired sensor could be positioned in a sensor port on the bottom portion 46, and the wire could be run through a channel in the bottom portion. The determination of whether a sensor is connected to a top sensor port 62 or a sensor port located elsewhere on the cartridge can be made based on many factors, including size and dimensions of the sensor, desired position or relational position of the sensor verses other components in the gearbox, etc.

The sensor ports 62 can also be positioned on either the front or back side of the cartridge body 42. As shown the sensor ports 62 are on the front side of the cartridge body 42 away from the diaphragm 36. This can help ensure that the sensor 64 does not interfere with the operation of the diaphragm 36. The sensor port 62 and/or sensor 64 can also be on the back side of the cartridge body 42.

Referring to FIGS. 9-12, a cartridge body 42 is shown. The cartridge body 42 has a top portion 44 and a bottom portion 46. The top portion 44 can be used to connect the cartridge 40 to the gearbox 10 while the bottom portion 46 is positioned inside of the gearbox 10. In some embodiments, the bottom portion 46 can be approximately 4.5 by 4.5 inches and when the diaphragm 36 is attached to the bottom portion 46 the total width can be about 1 to 1.25 inches. In some embodiments, the diaphragm can have a top surface area of about 10-11 inches squared. Other embodiments can have different dimensions.

The cartridge body 42 has two sensor ports 62. It can be seen that, in this embodiment, the two sensor ports are different sizes and are located at slightly different positions with respect to the distance away from the vent 48. The one or more sensor ports 62 can be many different sizes. For example, the sensor port 62 can be a threaded hole that is ½" NPT diameter or ⅜" NPT diameter. The one or more sensor ports 62 can be sized and positioned to fit particular sensors 64. Where the cartridge body 42 has more than one sensor port 62, they can be different sizes and at different positions to increase the flexibility of the cartridge body to allow more types of sensors to be used.

For example, a sensor, such as a float sensor, may require a certain amount of clearance between the sensor (i.e. the float) and the rest of the cartridge. At the same time a long probe, such as to measure temperature or detect moisture, may need to be positioned in a particular location so as to avoid certain other components within the gearbox such as the gears and the shaft. Having multiple sensor ports 62 of different sizes and at different locations can allow for these different types of sensors to be used. At the same time, in some situations it may be desired to have two or more sensor ports that are the same size and/or positioned or centered similarly.

The sensor(s) 64 can comprise at least one of any number of sensors including sensors to measure or detect: temperature, oil level, moisture, pressure, conductivity, etc. Looking to FIGS. 13-14, a temperature sensor 64A can measure the temperature within the gearbox, for example the temperature of the gear oil within the gearbox. An oil level sensor 64B can measure the level of the oil within the gearbox. A moisture sensor or hydrometer 64C, as in FIG. 15, can detect the presence of moisture, or water within the gearbox. A conductivity sensor can detect the presence of metal shavings. These sensors can also be used for other purposes and other sensors can be used for these same and for different purposes. According to certain embodiments, the sensors are oil compatible and can operate in temperature ranges between 30-180 degrees F.

Figure 13:
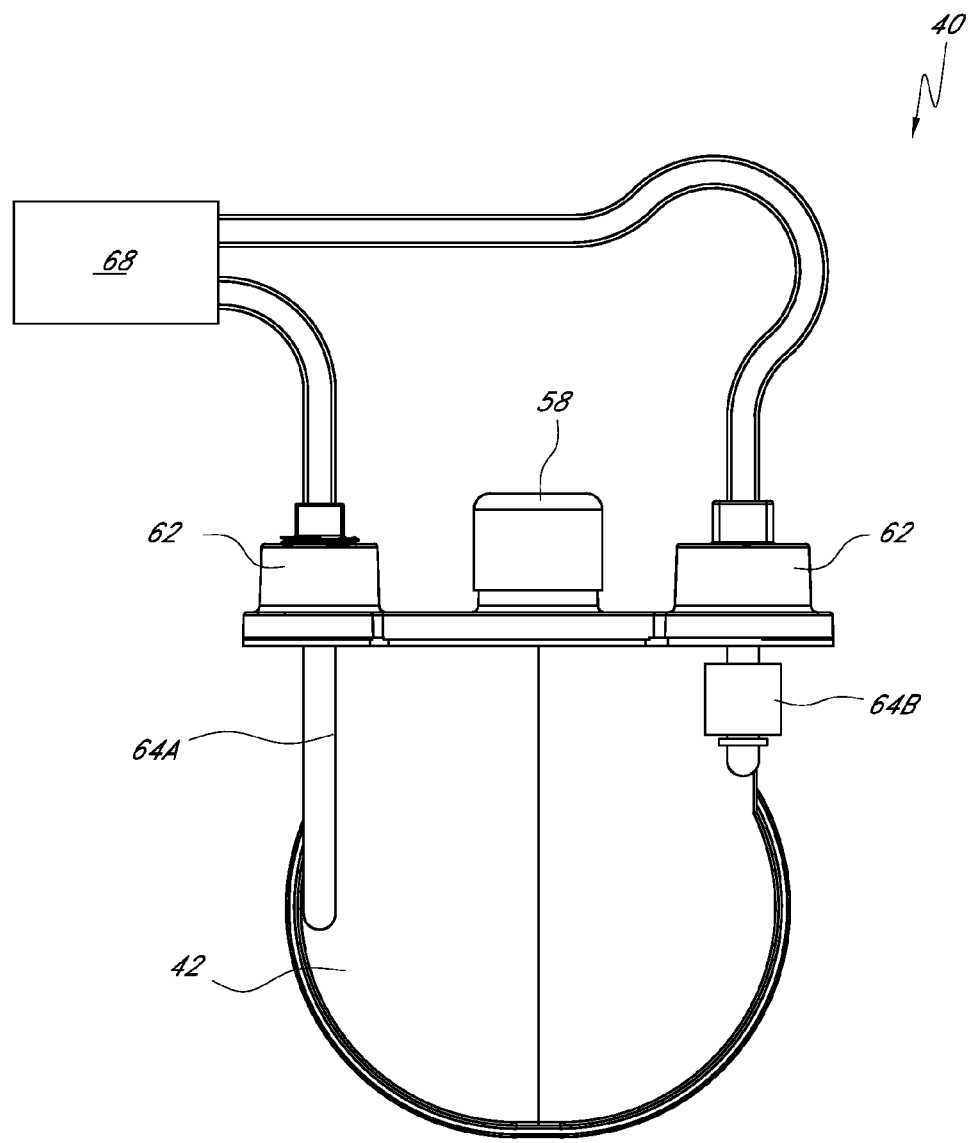
FIG. 13 shows an embodiment of a cartridge with sensors and a controller.

The sensor 64 can be connected with wires or wirelessly to a computer control 68 (FIG. 13). The computer control 68 can display, relay or store information from the sensor 64 for present or future use. The control 68 can be part of the gearbox or a separate unit. For example, on a central pivot irrigation system, a control can be located at the pivot which can collect information from one or more sensors, from one or more gearboxes on the system. In some embodiments, a monitoring system can be established to enable a user, such as a farmer to monitor the information from the sensors at a central location independent of the location of the sensors. The monitoring system can interact with the control(s) 68 or it may interact directly with the sensor(s) 64.

Figure 14:
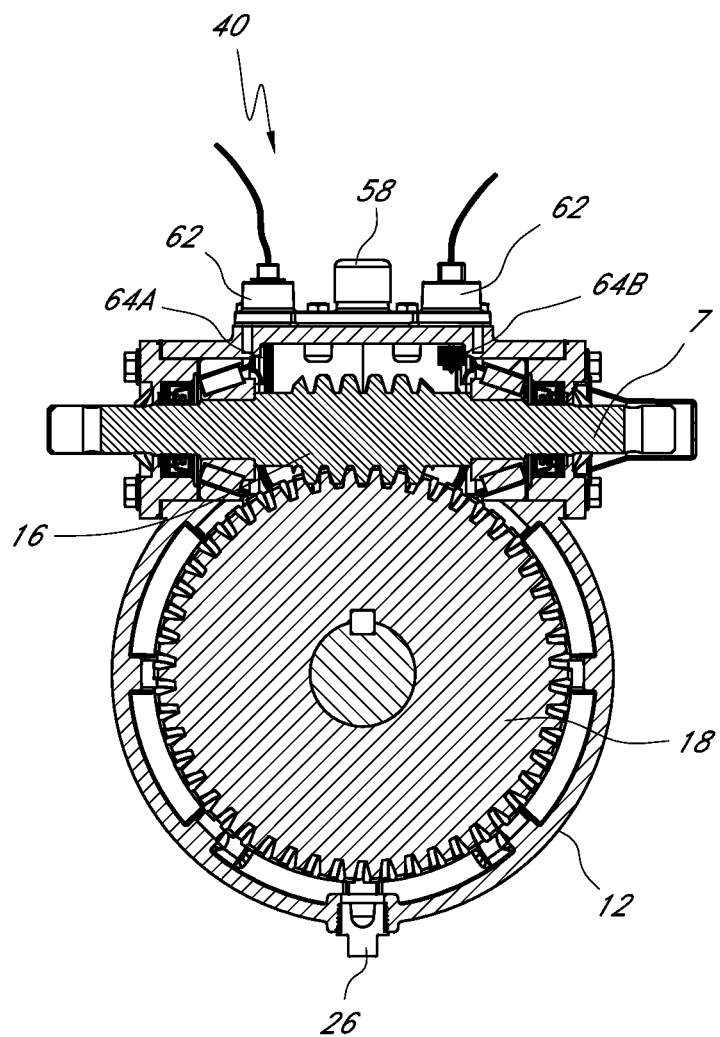
FIG. 14 illustrates a cartridge and sensors within a gearbox in cross-section.
Figure 15:
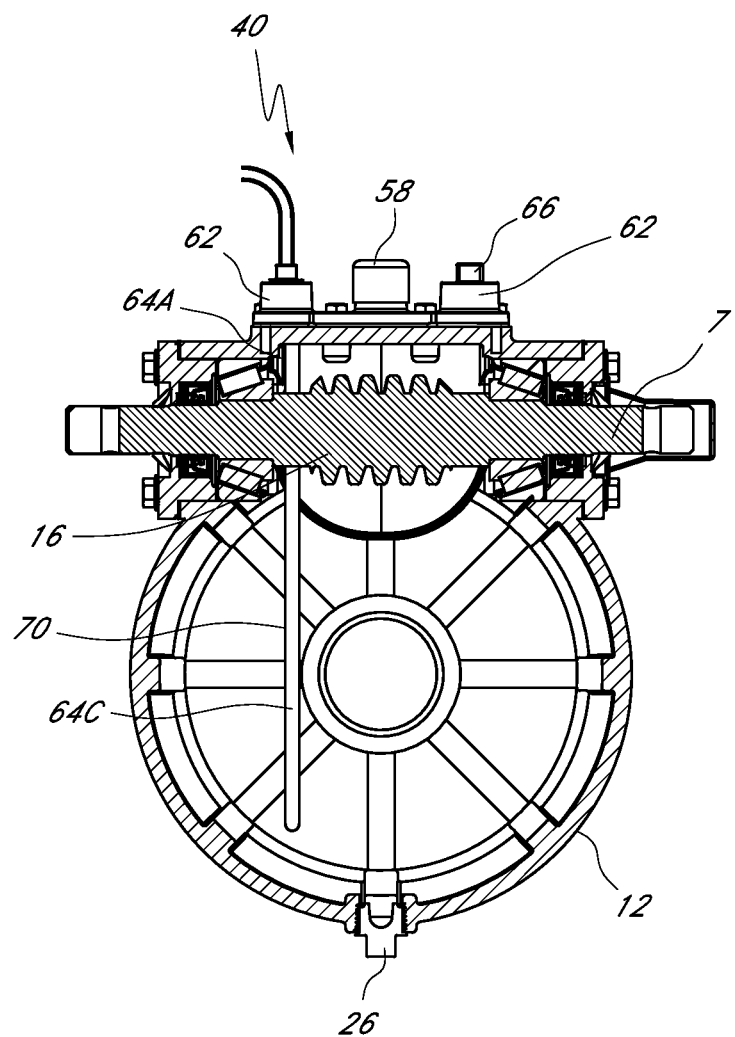
FIG. 15 is a view similar to that of FIG. 14 with a different sensor and with the bull gear removed.

The sensor(s) 64 can be positioned within the gearbox 10 and on the cartridge 40 in many different ways. For example, the sensor 64 can be attached to the cartridge 40 to be completely inside the gearbox 10 to transmit data wirelessly. In other embodiments, the sensor 64 can be completely or only partially within the gearbox and can transmit data with wires or wirelessly. As shown in FIGS. 13-15, the sensors can be positioned, above, behind, and/or to the sides of the gears. In FIG. 14, a temperature sensor 64A and float sensor 64B are located on either side of the worm gear 16. FIG. 15 shows a moisture sensor 64C that extends to the bottom of the housing 12. The moisture sensor 64C is behind the bull gear 18 which has been removed from the figure to be able to better see the sensor. The moisture sensor 64C is also shown to the side of the worm gear 16 and behind the shaft 7. The housing 12 can include a channel 70 that can facilitate the sensor 64C being able to extend a certain length down the housing 12 including all the way to the bottom of the housing. The portion of the moisture sensor 64C within the gearbox in some embodiments is about ⅛" to ¼" in diameter, but other shapes and sizes can also be used.

Figure 16:
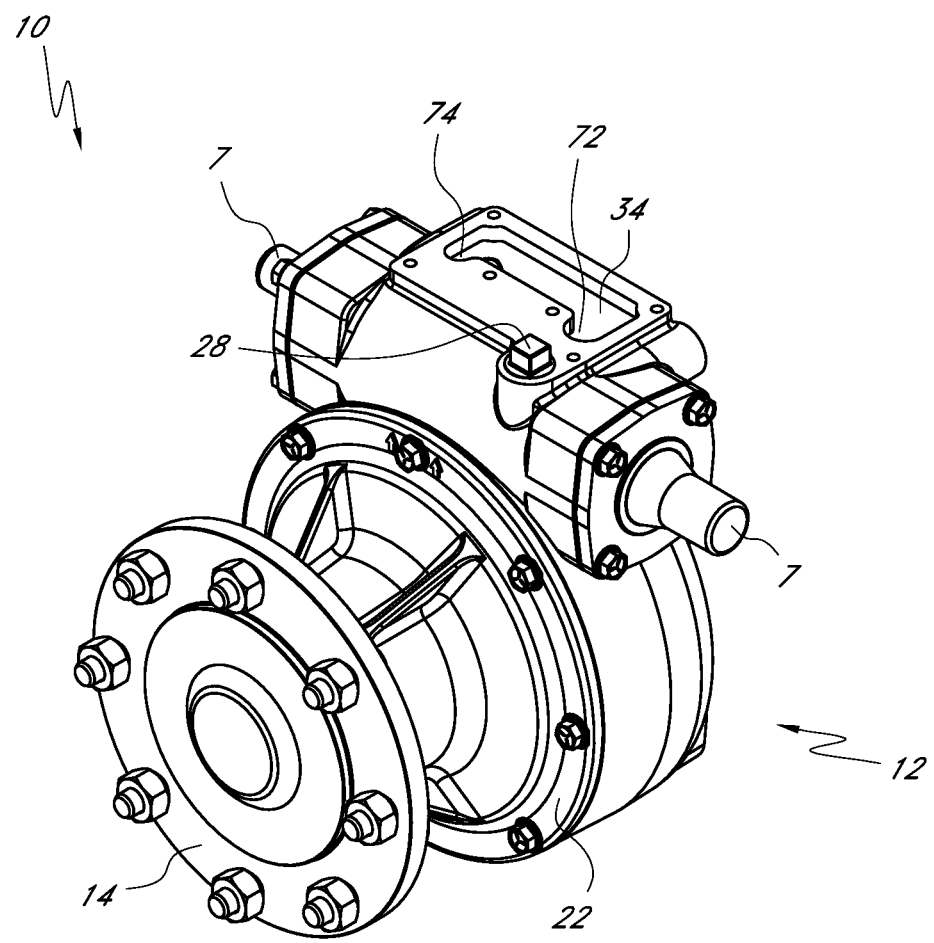
FIG. 16 is a perspective view of a gearbox illustrating a slot for inserting a cartridge.
Figure 17:
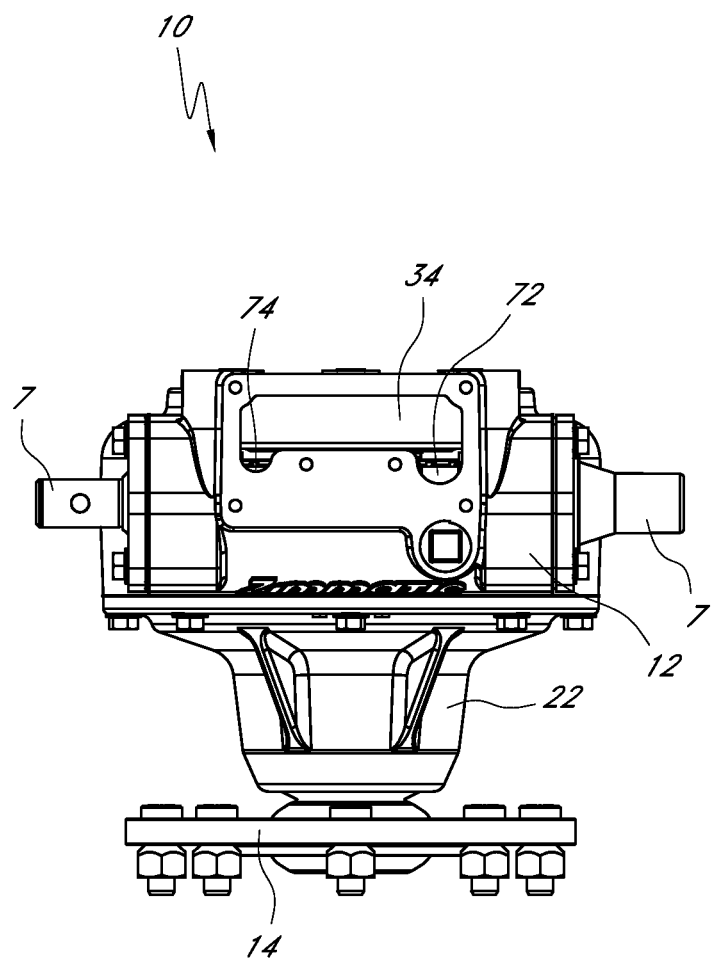
FIG. 17 is a top view of the gearbox of FIG. 16.

FIGS. 16-17 show an embodiment of a gearbox 10 where the expansion chamber has been removed. For example it can be seen that a cartridge as previously described herein, can be inserted into the opening, orifice or slot 34. An expansion chamber, such as a diaphragm, can also be used to cover the opening 34. The opening 34 can take many different shapes. As shown, the opening is elongated with two lobes 72, 74 that stick out at the ends, where the lobes both point in the same direction. In other embodiments, the opening 34 can be a simple or complex shape without any lobes, with one lobe or two or more lobes that point in the same, different and/or multiple directions. The lobes can be shaped and positioned to allow a sensor to pass through the lobe into the gearbox. The lobe can also be shaped so as to ensure that a sensor that would potentially engage the gears or shaft cannot enter the opening 34. The opening 34 can be configured so as to limit the size of the opening while still allowing the cartridge 42 to enter the opening.

In other embodiments, the gearbox can comprise one or more openings. For example, the gearbox can have three openings. One opening can be configured to receive the expansion chamber and each of the other two separate openings can be configured to receive a sensor.

Figure 18:
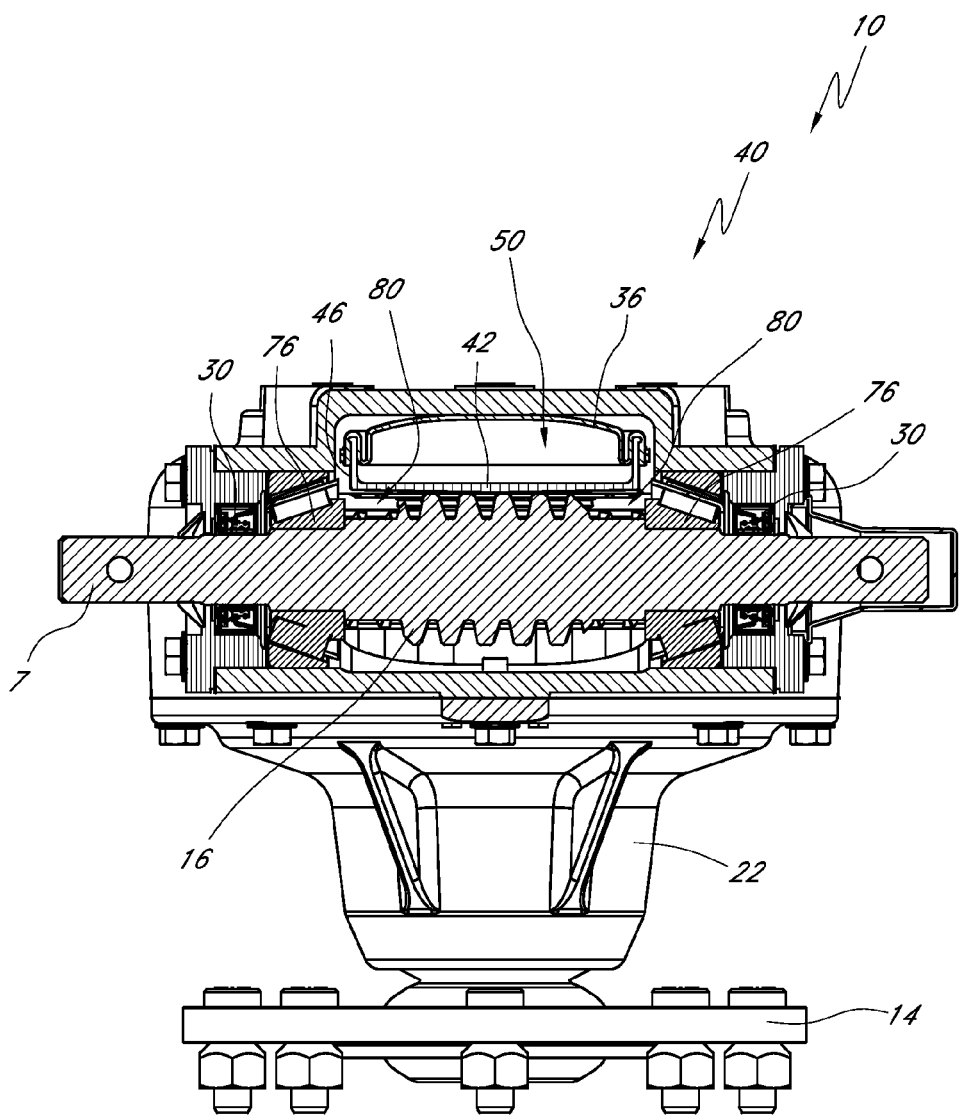
FIG. 18 is a cross-sectional top view of the gearbox illustrating the position of the cartridge relative to other components of the gearbox.

Looking now to FIG. 18, a cross-sectional top view of a gearbox 10 is illustrated showing the position of the cartridge 40 relative to other components of the gearbox. It can be desirable that the cartridge fit compactly in a space in the gearbox. It can be undesirable to create excess space inside the gearbox. For example, excess space can increase the amount of oil needed to fill the gearbox which can increase the costs of maintaining the gearbox. As can be seen in the embodiment shown in FIG. 18, there is a minimal amount of clearance between the cartridge 40, the walls of the gearbox and the worm gear 16. It can also be advantageous to maintain a compact configuration so that the improved gearbox can easily be used in place of existing gearboxes.

As discussed previously, the front of the cartridge body 42 bottom portion 46 is next to the worm gear 16 and the diaphragm 36 can be attached to the back to face away from the worm gear 16. The sensors ports 62 is advantageously configured to position a sensor within the regions 80 between the worm gear 16, shaft 7, bearings 76 and the front of the bottom portion 46. The size of the sensor can determine how far into the gearbox the sensor can extend. For example, as discussed with reference to FIG. 15, a small diameter sensor can extend to or near to the bottom of the gearbox 10. Other sensors can extend to the top of the worm gear or shaft or along the length of the front of the bottom portion 46 of the cartridge body 42. As additional examples, one embodiment of a sensor has a 0.25 inch shaft that extends 1.5 inches down from the sensor port 62, and another embodiment has a ⅝ inch shaft that extends ¾ inch from the port 62.

Although certain embodiments, features, and examples have been described herein, it will be understood by those skilled in the art that many aspects of the methods and devices shown and described in the present disclosure may be differently combined and/or modified to form still further embodiments. Additionally, it will be recognized that the methods described herein may be practiced in different sequences, and/or with additional devices as desired. Such alternative embodiments and/or uses of the methods and devices described above and obvious modifications and equivalents thereof are intended to be included within the scope of the present invention. Thus, it is intended that the scope of the present invention should not be limited by the particular embodiments described above, but should be determined only by a fair reading of the claims that follow.

What is claimed is:

1. A gearbox for an irrigation system comprising:
   a housing;
   a worm gear within the housing;
   a bull gear within the housing and configured to be engaged with the worm gear; and
   a removable cartridge configured to couple to the housing, the cartridge comprising:
      a diaphragm defining a chamber configured for expansion and contraction and configured to be positioned inside the housing to relieve pressure build-up within the housing; and
      a vent configured to allow air to flow between the atmosphere and the chamber
      wherein the cartridge is configured to be adjacent the worm gear with the diaphragm on a back side of the cartridge facing away from the worm gear.

2. The gearbox of claim 1, wherein the cartridge further comprises at least one sensor port.

3. The gearbox of claim 2, further comprising at least one of a temperature sensor, an oil level sensor, a pressure sensor, and a moisture sensor.

4. The gearbox of claim 2, wherein the at least one sensor port is configured to allow an attached sensor to extend vertically uninterrupted to a bottom of the housing.

5. The gearbox of claim 2, wherein the at least one sensor port is configured to position a sensor inside the gearbox between a front side of the cartridge and the worm gear.

6. The gearbox of claim 2, wherein the at least one sensor port is configured to position a sensor inside the gearbox between a front side of the cartridge, a bearing, a shaft and the worm gear.

7. A gearbox for an irrigation system comprising:
   a housing;
   a worm gear within the housing; and
   a bull gear within the housing and configured to engage the worm gear;
   wherein the housing comprises a cartridge opening at a top of the housing configured to receive an expansion cartridge, the opening having a main section and at least one lobe extending from the main section and configured to allow a sensor connected to the cartridge to enter the housing, the lobe positioned to allow the sensor to extend vertically downward from the lobe towards a bottom of the housing.

8. The gearbox of claim 7, further comprising a second lobe, wherein each lobe is on opposite ends of the opening.

9. The gearbox of claim 8, wherein each lobe extends away from the main section in the same direction.

10. The gearbox of claim 7, further comprising a diaphragm configured to connect to a top of the housing and to cover the opening.

11. The gearbox of claim 7, further comprising the expansion cartridge to be received into the opening.

12. The gearbox of claim 11, wherein the expansion cartridge comprising a diaphragm configured to be within the housing and at least one sensor port.

13. The gearbox of claim 12, further comprising at least one of a temperature sensor, an oil level sensor, a pressure sensor, and a moisture sensor.

* * * * *